United States Patent [19]

Piccinini et al.

[11] Patent Number: 5,012,615
[45] Date of Patent: May 7, 1991

[54] HERMETICALLY TIGHT SEALING DEVICE FOR MOTOR VEHICLES

[75] Inventors: Dino Piccinini; Domenico Arabino, both of Rome, Italy

[73] Assignee: SMAE - Societa' Meridionale Accessori Elastomerici S.p.A., Italy

[21] Appl. No.: 555,679

[22] Filed: Jul. 19, 1990

Related U.S. Application Data

[63] Continuation-in-part of Ser. No. 297,346, Jan. 17, 1989, abandoned.

[30] Foreign Application Priority Data

Jan. 15, 1988 [IT] Italy ................. 19075 A/88

[51] Int. Cl.⁵ ............................. E06B 7/16
[52] U.S. Cl. ....................... 49/477; 49/479; 296/146
[58] Field of Search ............ 49/477, 479; 296/146, 296/212

[56] References Cited

U.S. PATENT DOCUMENTS

| | | | |
|---|---|---|---|
| 2,301,963 | 11/1942 | Marple et al. | 296/146 |
| 2,469,131 | 5/1949 | Ross | 49/477 |
| 3,302,333 | 2/1967 | Ganzinotti et al. | 49/477 X |
| 4,374,880 | 2/1983 | Mesnel | |
| 4,665,653 | 5/1987 | Franz et al. | 49/477 |
| 4,761,917 | 8/1988 | Knecht et al. | 49/477 |
| 4,813,184 | 3/1989 | Weimar | 49/477 |

FOREIGN PATENT DOCUMENTS

| | | |
|---|---|---|
| 0115750 | 8/1984 | European Pat. Off. . |
| 1491554 | 7/1967 | France . |
| 2543250 | 9/1984 | France . |
| 59-128030 | 7/1984 | Japan . |
| 62012416 | 7/1985 | Japan . |
| 905808 | 9/1962 | United Kingdom ............ 49/477 |

*Primary Examiner*—Philip C. Kannan
*Attorney, Agent, or Firm*—Stevens, Davis, Miller & Mosher

[57] ABSTRACT

A hermetically tight sealing device for motor-vehicles comprising a plurality of tubular sealing strips made of elastically deformable material functioning to ensure a hermetically tight seal with respect to the outer environment. Each strip extends along a rabbet edge of a respective door on the body of the motor-vehicle and is capable of being compressed and elastically deformed between the rabbet edge of the vehicle body and the edge of the respective door to provide a hermetically tight seal between the same. Each sealing strip is connected to a compressor to be inflated up to and maintained at a pre-established inner pressure during running of the motor vehicle, under control of a pressure switch.

3 Claims, 3 Drawing Sheets

HERMETICALLY TIGHT SEALING DEVICE FOR MOTOR VEHICLES

This application is a Continuation-In-Part of application Ser. No. 297,346, filed Jan. 17, 1989 now abandoned.

FIELD OF THE INVENTION

This invention relates to a hermetically tight sealing device for motor-vehicles of the type comprising a plurality of sealing strips formed of elastically deformable material extending along the perimeter of the rabbet edges of the respective doors on the body of the motor-vehicle, with each of the strips being adapted to be compressed and elastically deformed between one of the rabbet edges of the vehicle body and one edge of the respective door to provide a hermetically tight seal between the same.

More particularly, the hermetically tight sealing device according to the invention is particularly designed to be utilized on motor-cars of considerable value in order to ensure the hermetically tight seal between the vehicle doors and body also at high speeds. This, however, does not exclude the possibility of utilizing the device also on other types of motor-vehicles.

BACKGROUND OF THE INVENTION

As known, it is necessary to ensure a hermetically tight seal, in motor-vehicles, between the perimeter of the doors' edges and the corresponding rabbet edges provided on the body of the motor-vehicle.

To provide such sealing, proper rubber sealing strips or sealing strips made of other elastically deformable material are presently adopted. Such sealing strips are fixed along the perimeter of the rabbet edges of the vehicle body and are adapted to be compressed between the rabbet edges of the vehicle body and the edges of the respective doors, when the door is closed relative to the vehicle body.

The sealing strips generally have a tubular section communicating with the outer environment and include longitudinal zones having differentiated wall thickness relative to other respective longitudinal zones but wherein each cross-section thereof has a uniform wall thickness both in order to be able to follow the numerous curvatures along the edges of the perimeter of the vehicle body without undergoing superficial wrinkling and to present zones of preferential deformation to ensure a better hermetically tight seal when the sealing strips are compressed between the door and the vehicle body.

The conventional sealing strips, as described above, although satisfactory in most situations, cause some problems as follows.

A first problem is the necessity of having relatively small tolerances in relation to the coupling between the doors and the vehicle body.

In fact, particularly when the doors have a considerable length, a small mistake in the hinges' coupling can result in the door edges farther from the hinges not precisely fitting on the rabbet on the sealing strip, seriously jeopardizing the hermetically tight seal in these zones.

The perfect hermetically tight seal may also be compromised when, during running of the motor-vehicle at high speed, the aerodynamic low pressure zones that rise along the sides and in the rear part of the motor-vehicle tend to move the doors farther from the body. This can cause, in some points, a disengagement between the edge of the door and the sealing strip, provoking annoying whistling noises due to infiltrations of air and rain water inside the motor-vehicle.

SUMMARY OF THE INVENTION

The object of the present invention is to resolve the draw-backs of the conventional technique through realizing a device able to ensure, in any situation, a perfect hermetically tight seal between the doors and body of a motor-vehicle while avoiding any requirement of high coupling tolerances between the doors and vehicle body.

This object as well as other objects, which will be more fully apparent from the following description and attached drawings, will be substantially achieved by a hermetically tight sealing device for motor-vehicles, characterized in that each of the sealing strips has a tubular section hermetically closed with respect to the outer environment, with the sealing strip served by feeding means to be inflated by operative fluid and maintained at a preestablished inner pressure within the tubular sealing means.

According to the invention, there is provided a device for hermetically sealing a door of a motor-vehicle. The device includes a sealing strip adapted to extend along a rabbet edge of a body portion of the vehicle and includes a sealing portion made of an elastically deformable material capable of being compressed and elastically deformed between the rabbet edge and an edge of the door to be received in the rabbet edge to provide a hermetically tight seal between the body portion and the door. The sealing portion includes a tubular section having an inner portion hermetically closed relative to the ambient. The device further includes an operation means, connected to the sealing portion, for (i) inflating the sealing portion with a fluid until an inner pressure within the inner portion of the sealing portion reaches a predetermined pressure and maintaining the predetermined pressure within the inner portion of the sealing portion responsive to the door being closed relative to the body portion of the vehicle and (ii) deflating the inner portion of the sealing portion responsive to the door being opened relative to the body portion of the vehicle.

The operation means may include a compressor; a feeding solenoid valve means, interconnected between the compressor and the sealing strip, for placing the compressor in fluid communication with the inner portion of the sealing portion responsive to being energized in response to the door being closed relative to the body portion of the vehicle; a discharge solenoid valve means, connected to the sealing strip, for placing the inner portion of the sealing portion in communication with the ambient in one mode and for hermetically closing the communication between the inner portion of the sealing portion and the ambient in another mode responsive to being energized in response to the door being closed relative to the body portion of the vehicle; and a pressure switch means, connected to the feeding solenoid valve means, for deenergizing the feeding solenoid valve means to interrupt the fluid communication between the inner portion of the sealing portion and the compressor responsive to the inner pressure within the inner portion of the sealing portion reaching the predetermined pressure.

BRIEF DESCRIPTION OF THE DRAWINGS

Further characteristics and advantages of the invention will be more fully apparent from the following detailed description of a preferred, but not exclusive, embodiment of a hermetically tight sealing device for motor-vehicles according to the present invention given only by way of example, with reference to the accompanying drawings, in which.

DETAILED DESCRIPTION OF THE PREFERRED EMBODIMENT

Figure 1:
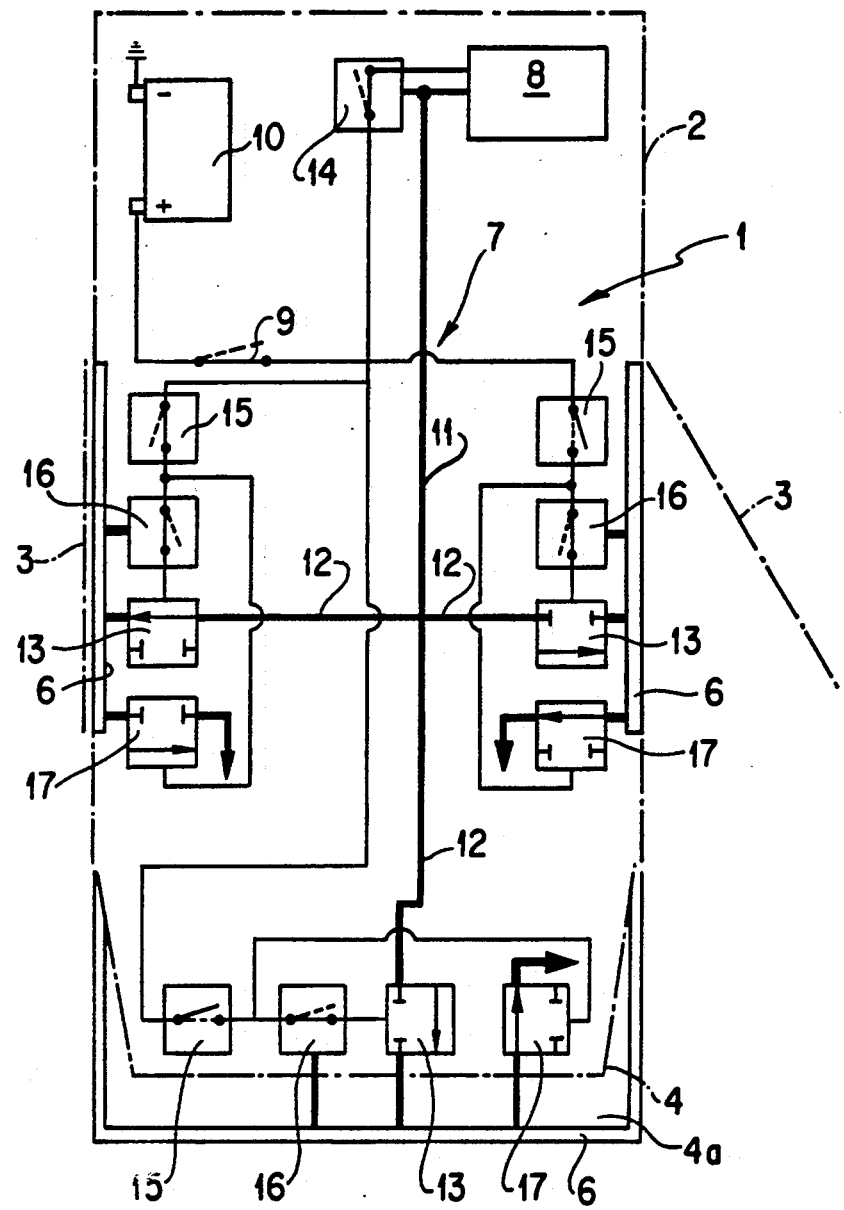
FIG. 1 is an electro-pneumatic schematic diagram of the device according to the invention applied on a motor-vehicle.

With reference to the cited figures, reference numeral 1 identifies a hermetically tight sealing device for motor-vehicles according to the present invention.

In the embodiment schematically illustrated in FIG. 1, device 1 is combined with a motor-car 2 having two lateral doors 3 that allow admittance to the interior seating of the motor-car and a rear door 4 combined with a trunk 4a.

A hermetically tight seal is realized between doors 3 and 4 and body 5 of motor-car 2, when doors 3 and 4, are in a closed condition.

In such connection, a sealing strip 6 is provided for each door 3 and 4, with sealing strip 6 extending along the length of a rabbet edge 5a obtained on body 5.

In its turn, rabbet edge 5a is substantially shaped according to the perimeter length of respective door 3 or 4.

Figure 2:
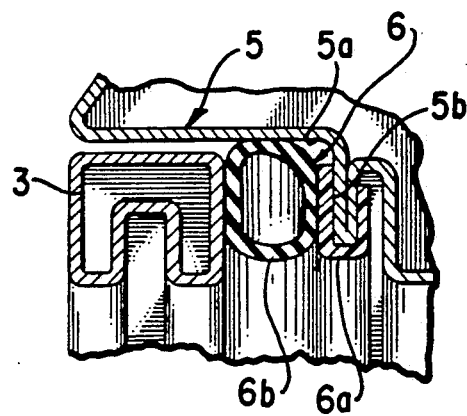
FIG. 2 is a cross-section of the sealing strip interposed between the rabbet edge of the body and the edge of the door of the motor-vehicle.

More particularly, each sealing strip 6 has a fastening portion 6a engaged, through a forced insertion, on a wing 5b presented by body 5 and a sealing portion 6b made of elastically deformable material, integral to fastening portion 6a and designed to be compressed and elastically deformed as shown in FIG. 2, between the rabbet edge 5a and the perimeter edge of door 3, 4 to provide a hermetically tight seal between the same.

Advantageously, according to the present invention, sealing portion 6b of sealing strip 6 has a novel tubular section hermetically closed with respect to the outer ambient environment.

The isolation of the inner part from the outer environment of sealing portion 6b can be obtained by hermetically closing the opposed ends of sealing portion 6b, or hermetically welding such ends so that sealing strip 6 is in the form of a closed ring.

Operating means 7 are combined with sealing strips 6; operating means 7 function to inflate sealing portions 6b with operative fluid, preferably air, sufficient to reach and maintain a predetermined pressure inside the inner portions of the sealing portions.

In the illustrated embodiment, operating means 7 comprise an electrical compressor 8 which may be put in action by using main switch 9 connected to a conventional battery 10 in motor-car 2.

Switch 9 is preferably constituted by the conventional ignition group situated on the motor-car dash board, the activation of which is obtained by using the ignition key.

The installation might also function with the panel disconnected provided that a suitable feeding is ensured by battery 10.

A main delivery conduit 11 is connected to compressor 8. Secondary delivery conduits 12 are connected to conduit 11, each communicating with the inner portion of one of sealing strips 6 through a feeding solenoid valve 13.

A pressure switch 14 of maximum value is associated with compressor 8; pressure switch 14 functions to interrupt current fed to compressor 8, when a predetermined pressure value is reached in main delivery conduit 11.

Each solenoid valve 13 is excitable by putting in action a secondary switch 15 connected in series with main switch 9 and functioning to electrically feed the associated solenoid valve 13 in connection with the closure of corresponding door 3 or 4.

When solenoid valve 13, as shown in FIG. 1 with reference to right door 3 and rear door 4 of trunk 4a, is not energized, fluid communication between auxiliary delivery conduit 12 and sealing portion 6b of the corresponding sealing strips 6 is also interrupted.

On the other hand (as illustrated in FIG. 1 with reference to left door 3), when solenoid valve 13 is energized, in connection with the closure of door 3 and also of switch 15, auxiliary delivery conduit 12 is connected to the inside of respective sealing portion 6b.

Preferably, each solenoid valve 13 is also served by an auxiliary pressure switch 16 which operates to interrupt electrical current to cause a consequent lack of energy in its associated solenoid valve 13, when the pressure inside sealing portion 6b reaches a pre-established value, preferably slightly lower than the calibration value of main pressure switch 14.

Additionally, a discharge solenoid valve 17 is connected with each sealing strip 6. Valve 17 is excitable in connection with the closure of the respective secondary switch 15. When discharge solenoid valve 17 is not energized, sealing portion 6b is put into communication with the outer environment to determine the discharge of air contained in the inner portion of sealing portion 6b.

On the other hand, when discharge solenoid valve 17 is energized, the discharge of sealing portion 6b—toward the outer environment—is hermetically closed.

Operation of the above-described preferred embodiment is as follows.

When motor-car 2 is not running, sealing strip 6 appears connected with the outer environment through discharge solenoid valve 17 and is compressed between rabbet edge 5a and the perimeter edge of corresponding door 3 or 4.

During starting of the motor-car, main switch 9 is closed, and, consequently, compressor 8 is put in action, with compressor 8 sending air in main delivery conduits 11 and auxiliary conduits 12.

If doors 3 and 4 are open, secondary switches 15 do not energize solenoid valves 13; this absence of energy in solenoid valves 13 prevents the air sent through delivery conduits 12 from reaching the inner cavities of sealing strips 6.

Consequently, the pressure inside main delivery conduits 11 and auxiliary conduits 12 increases to determine the disengagement of compressor 8 by main pressure switch 14.

When one of doors 3 and 4 is closed, the closure of the respective secondary switch 15 gives energy to solenoid valves 13 and 17.

As a result, the inner cavities of sealing portion 6b are isolated from the outer environment and connected to auxiliary delivery conduits 12.

In this manner, the air sent in the auxiliary delivery conduit can inflate sealing strip 6.

The consequent fall of pressure inside main delivery conduit 11 and auxiliary conduits 12 cause compressor 8 to be put in action again by order of main pressure switch 14.

When the pressure inside sealing strip 6 has reached a pre-established value, auxiliary pressure switch 16 determines the lack of energy of solenoid valve 13.

Sealing strip 6 remains hermetically closed with respect to the outer environment and inflated with air under pressure.

In this condition, the walls of sealing portion 6b are compressed against rabbet edge 5a and the perimeter edge of respective door 3 or 4, so as to ensure a perfect hermetically tight seal also in the event that, e.g., the door tends to move away from the body in response to aerodynamic depressions.

As a matter of fact, even if a door 3 or 4 is moving away from rabbet edge 5a, the pressure existing inside sealing portion 6b causes dilatation of the walls of sealing portion 6b; these walls are consequently maintained in contact with the respective rabbet edges.

The consequent fall of pressure inside sealing portion 6b, due to the increase of the inner volume thereof, gives energy to solenoid value 13 due to the action of auxiliary pressure switch 16, and causes the eventual activation of compressor 8 in order to re-establish the working pressure value inside sealing portion 6b.

When door 3 or 4 is newly opened, the aperture of secondary switch 15 determines the lack of energy both in solenoid valve 13 and in discharge solenoid valve 17.

In this manner, the compressed air in sealing portion 6b is evacuated into the outer environment to avoid obstructing the subsequent closure of the same door.

As is apparent from the above description, it can be readily seen that the sealing device according to the invention is able to ensure a perfect hermetically tight seal also in a case in which the doors tend to move away from the vehicle body due to aerodynamic depressions which occur along the sides of the rear part of the motor-car when running at high speed.

In this manner, the drawback caused by aerodynamic noises and/or infiltrations of water during running at high speed is eliminated.

Also, due to the possibility of dilatation provided by sealing portion 6b, the sealing device according to the invention is able to ensure a perfect hermetically tight seal although the coupling between the doors and the vehicle body is not extremely precise.

Clearly, the present invention will include in its scope many modifications or alternative embodiments not expressly described above, without departing from the scope of the above-described inventive idea.

Figure 3B:
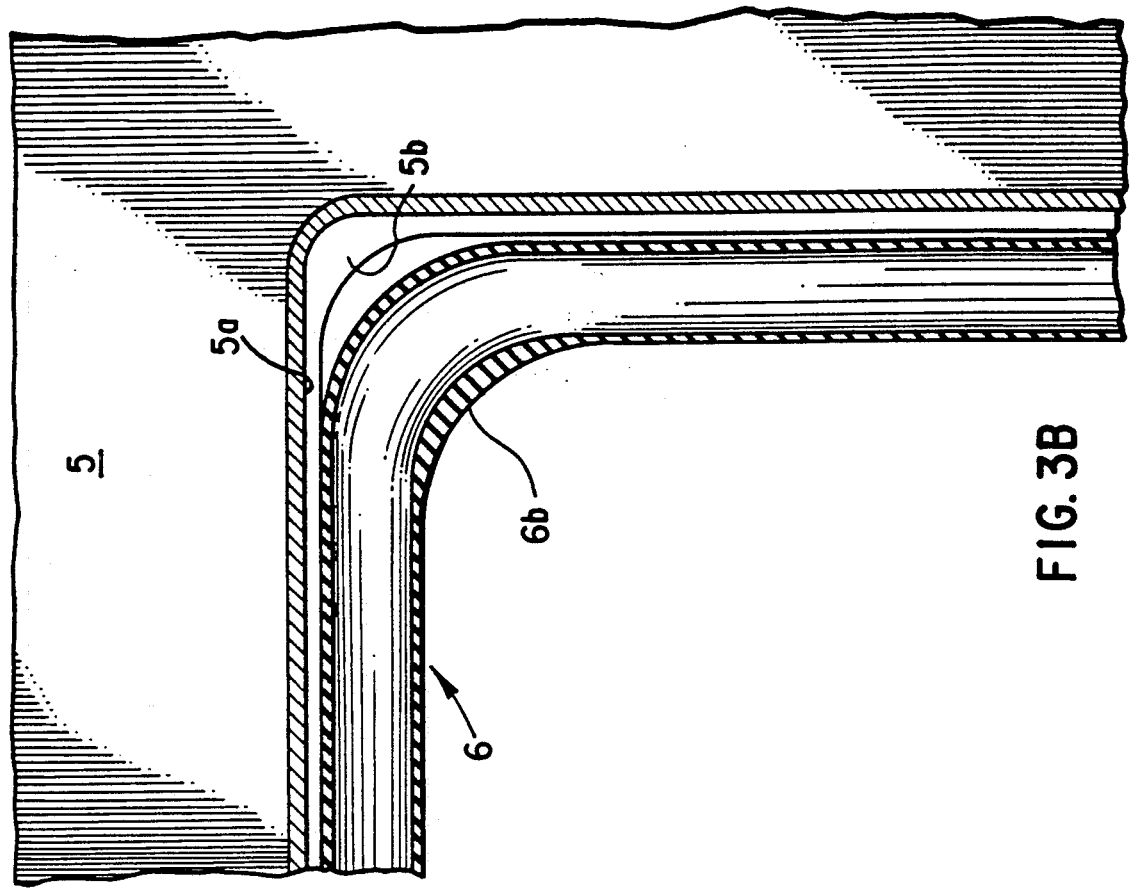
FIGS. 3A and 3B illustrate a section of a sealing strip which has various cross-sectional portions each of which have different zones of differentiated wall thickness.
Figure 3A:
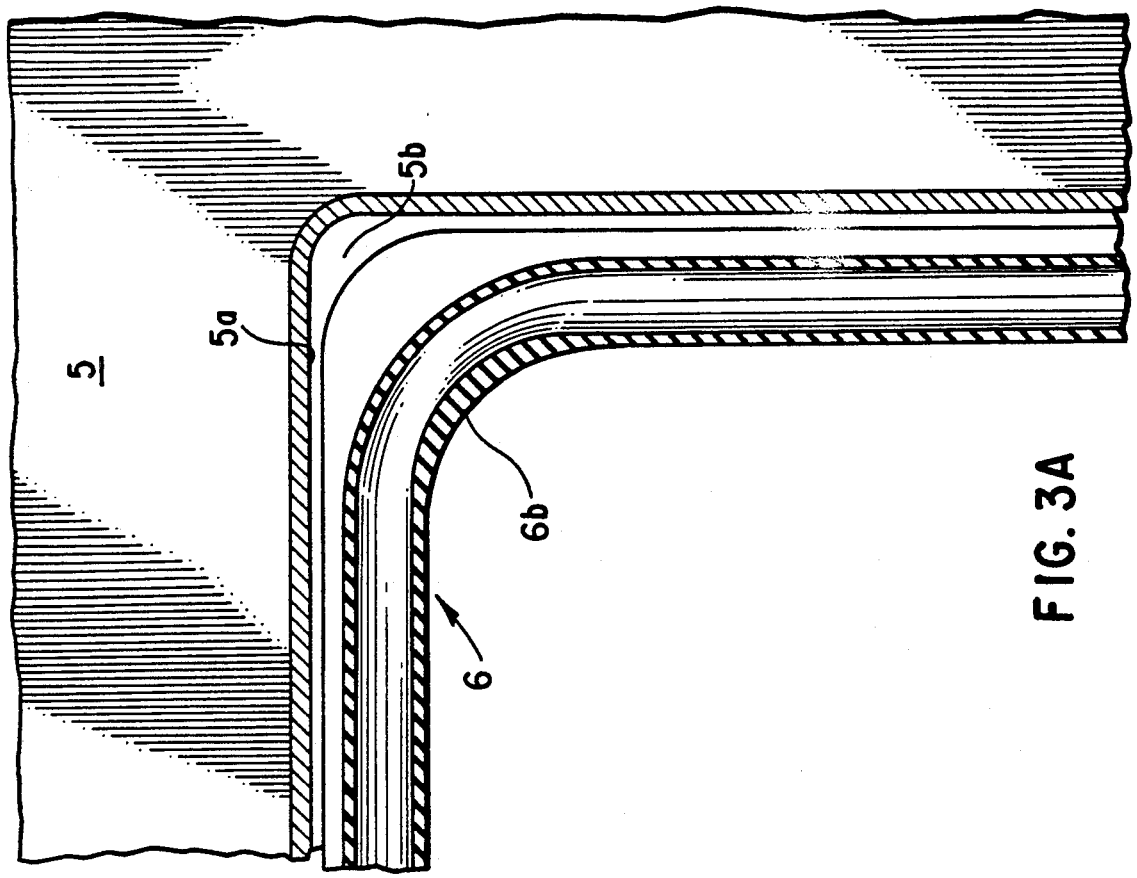
Figure 4:
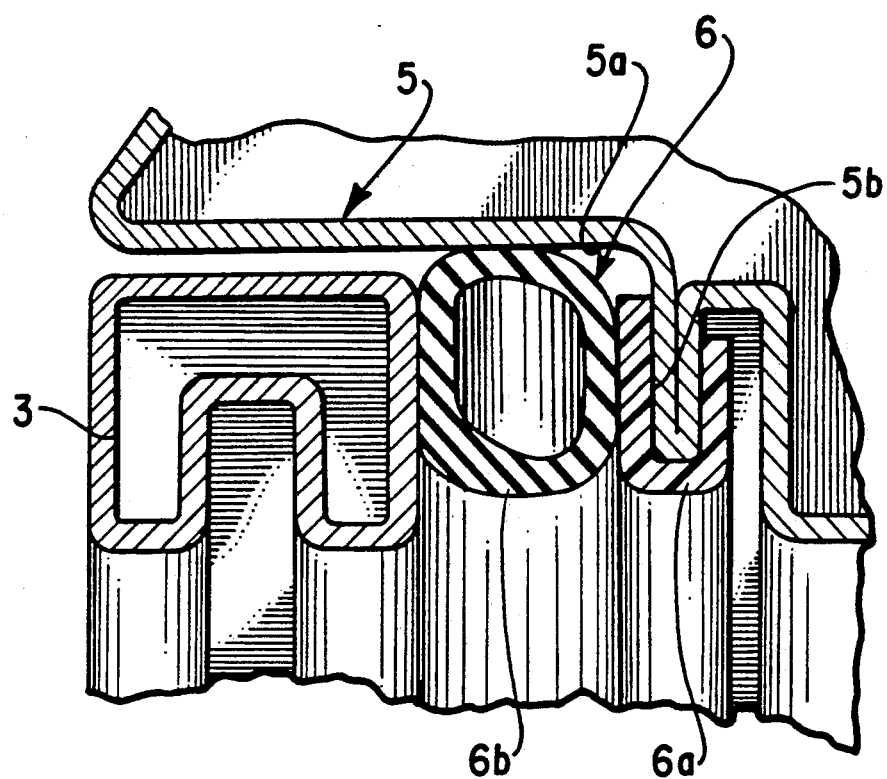
FIG. 4 illustrates a cross-section of a sealing strip which has different zones of differentiated wall thickness.

For example, a cross-section of sealing portions 6b may itself include different zones having differentiated wall thickness (as illustrated in FIGS. 3A, 3B and 4) in order to provide to said cross-section of sealing portion 6b, when it is inflated, the tendency toward dilatation in a predetermined direction relative to said cross-section.

Also, each sealing strip 6 may be formed of a consecutive union of a plurality of lengths, each presenting a different section in sealing portion 6b, in order to meet various requirements arising from the different working conditions of the sealing strips along the various lengths of the perimeter of rabbet edge 5a.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. A device for hermetically sealing a door of a motor-vehicle, said device comprising:

a sealing strip adapted to extend along a rabbet edge of a body portion of said vehicle and comprising a sealing portion made of an elastically deformable material capable of being compressed and elastically deformed between the rabbet edge to provide a hermetically tight seal between the body portion and the door, said sealing portion comprising a tubular section including (i) an inner portion hermetically closed relative to the ambient and (ii) zones within a same cross-section of said tubular section having differentiated thickness for providing the sealing portion, when the sealing portion is inflated, with a tendency toward dilatation in a predetermined direction relative to said cross-section of said tubular section;

an operation means, connected to said sealing portion, for (i) inflating said sealing portion by passing a fluid into said inner portion of said sealing portion until an inner pressure within said inner portion of said sealing portion reaches a predetermined pressure and maintaining said predetermined pressure within said inner portion of said sealing portion, responsive to said door being closed relative to said body portion of the vehicle and (ii) deflating said inner portion of said sealing portion responsive to said door being opened relative to said body portion of the vehicle.

2. A device as in claim 1, wherein said operation means includes:

a compressor;

a feeding solenoid valve means, interconnected between said compressor and said sealing portion, for placing said compressor in fluid communication with said inner portion of said sealing portion responsive to being energized in response to said door being closed relative to said body portion of the vehicle;

a discharge solenoid valve means, connected to said sealing portion, for placing said inner portion of said sealing portion in communication with the ambient in one mode and for hermetically closing said communication between said inner portion of said sealing portion and said ambient in another mode responsive to being energized in response to said door being closed relative to said body portion of the vehicle; and a pressure switch means, connected to said feeding solenoid valve means, for deenergizing said feeding solenoid valve means to interrupt said fluid communication between said inner portion of said sealing portion and said compressor responsive to said inner pressure within said inner portion of said sealing portion reaching said predetermined pressure.

3. A device for hermetically sealing a door of a motor-vehicle, said device comprising:

a first sealing strip adapted to extend along a first rabbet edge of a body portion of said vehicle and comprising a first sealing portion made of an elastically deformable material capable of being compressed and elastically deformed between said first rabbet edge and an edge of one of said doors to be received in said first rabbet edge to provide a hermetically tight seal between said body portion and said one of said doors, said first sealing portion comprising a first tubular section including an inner portion hermetically closed relative to the ambient and zones within a same cross-section of said first tubular section having differentiated thickness for providing the first sealing portion, when the first sealing portion is inflated, with a tendency toward dilatation in a predetermined direction relative to said cross-section of said first tubular section;

a second sealing strip adapted to extend along a second rabbet edge of a body portion of said vehicle and comprising a second sealing portion made of an elastically deformable material capable of being compressed and elastically deformed between said second rabbet edge and an edge of another one of said doors to be received in said second rabbet edge to provide a hermetically tight seal between said body portion and said another one of said doors, said second sealing portion comprising a second tubular section including an inner portion hermetically closed relative to the ambient and zones within a same cross-section of said second tubular section having differentiated thickness for providing the second sealing portion, when the second sealing portion is inflated, with a tendency toward dilatation in a predetermined direction relative to said cross-section of said second tubular section; and an operation means including (i) a compressor, (ii) a first feeding solenoid valve means, interconnected between said compressor and said first sealing strip, for placing said compressor in fluid communication with said inner portion of said first sealing portion responsive to being energized in response to said one of said doors being closed relative to said body portion of the vehicle, (iii) a first discharge solenoid valve means, connected to said first sealing strip, for placing said inner portion of said first sealing portion in communication between said inner portion of said first sealing portion and said ambient, responsive to being energized in response to said one of said doors being closed relative to the body portion of the vehicle, (iv) a second feeding solenoid valve means, interconnected between said compressor and said second sealing strip, for placing said compressor in fluid communication with said inner portion of said second sealing portion responsive to being energized in response to said another one of said doors being closed relative to the body portion of the vehicle; (v) a second discharge solenoid valve means, connected to said second sealing strip, for placing said inner portion of said second sealing portion in communication with the ambient and for hermetically closing said communication between said inner portion of said second sealing portion and said ambient, responsive to being energized in response to said another one of said doors being closed relative to the body portion of the vehicle, and (vi) a pressure switch means, connected to said first feeding solenoid valve means and said second feeding solenoid valve means to interrupt said fluid communication between said inner portion of said first sealing portion and said compressor responsive to said inner pressure within said inner portion of said first sealing portion reaching said predetermined pressure and for deenergizing said second feeding solenoid valve means to interrupt said fluid communication between inner portion of said second sealing portion and said compressor responsive to said inner pressure within said inner portion of said second sealing portion reaching said predetermined pressure.

* * * * *